United States Patent Office 2,815,360
Patented Dec. 3, 1957

2,815,360

PREPARATION OF PHYTIC ACID

Arthur R. Baldwin, Minneapolis, Minn., Ludwig K. Blatter, Berwyn, Ill., and Dudley M. Gallagher, Elizabethton, Tenn., assignors to Corn Products Refining Company, New York, N. Y., a corporation of New Jersey No Drawing. Original application September 6, 1952, Serial No. 308,288. Divided and this application July 18, 1955, Serial No. 522,884

11 Claims. (Cl. 260—461)

This invention relates to the preparation of phytic acid from commercial phytates, such as are obtained by precipitation from corn steepwater with lime, magnesium hydroxide, caustic soda, or the like.

It is an object of this invention to produce phytic acid from a relatively cheap starting material by a practical and economic method. A further object is to prepare phytic acid of satisfactory quality for use as a stabilizing agent in vegetable oils, for sequestering ions of heavy metals, and as a starting material for preparation of pure salts or other derivatives of phytic acid.

Phytic acid is the hexaphosphoric acid ester of inositol, and is considered to have the following formula:

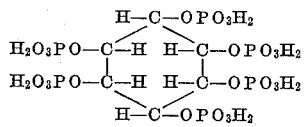

This acid does not occur free in nature but exists, particularly in the plant kingdom, as mixed acid salts; potassium and magnesium probably are the predominant metallic ions in these acid phytates.

Cereal grains are particularly rich in phytates; corn steepwater, produced in the wet milling of corn, is one of the best sources of such material. To recover the phytate from corn steepwater it is customary to neutralize the same with an alkaline material, suitably lime, causing the phytate to precipitate as a crude salt which can be removed readily by filtration. This material contains substantial amounts of magnesium, even though lime may have been employed as precipitant, and traces of other metallic ions, as well as some proteinaceous materials and other contaminants from the steepwater. It may be partially purified by dissolving in acid and reprecipitating but, nevertheless, such commercial phytates do not represent pure salts. They always contain some magnesium, appreciable amounts of iron and nitrogenous materials, and traces of heavy metals, such as copper.

Heretofore, no economical method for preparing pure phytic acid was known. The classical method was to dissolve calcium phytate in an acid such as hydrochloric acid, and then add a solution of a copper salt, such as copper sulfate to precipitate copper phytate. The latter was suspended in water and treated with hydrogen sulfide, which formed insoluble copper sulfide and released phytic acid to the solution. After removing the copper sulfide by filtration, the filtrate was concentrated to yield phytic acid as a syrup. Phytic acid is known to sequester heavy metal ions, and it was almost impossible to obtain a copper-free product by this means. In addition, the process was far too expensive to be attractive for commercial use.

Various other methods have been employed to obtain phytic acid from commercial phytates but these also are either too expensive to warrant commercial exploitation or do not yield a product of satisfactory grade. For example, calcium phytate can be converted to substantially pure sodium phytate by known processes and the sodium phytate dissolved in water and treated with hydrogen chloride. Sodium chloride precipitates and can be removed, and the solution may be concentrated to obtain phytic acid. However, during the concentration more sodium chloride precipitates and exhaustive treatment is required to obtain a salt-free product. The necessity of first preparing sodium phytate and the nature of the treatment required to convert it to phytic acid make such a process impractical on a large scale.

Another method which has been employed to produce phytic acid is to dissolve commercial calcium phytate in sulfuric acid, remove the resultant calcium sulfate by filtration, and concentrate the filtrate. Although a substantial portion of the calcium can be removed by this method, magnesium and proteinaceous contaminants are not eliminated, so that the resulting filtrate, when concentrated, contains prohibitive amounts of ash and other impurities, including heavy metal ions. Phytic acid prepared by this method is, therefore, high in ash and other impurities, has poor color initially, turns almost black on storage, and is entirely unsuited for most uses.

More recently a process was developed wherein commercial calcium phytate was dissolved in an acid such as hydrochloric acid and the resulting solution was contacted with a cation exchange resin to remove the calcium from the solution. However, no satisfactory means for removal of the acid used for solubilization was available; thus, products prepared by this means contained other anions, such as chloride and were not free of heavy metal cations and other impurities. Consequently, they were of poor color and had poor stability on storage.

We have now discovered that aqueous slurries of crude phytates selected from the group consisting of commercial grade calcium phytate, magnesium phytate, calcium-magnesium phytate, and mixtures thereof, will react with a cation exchange resin in the hydrogen state, the metallic cations of the phytate being adsorbed by the resin and the phytic acid being liberated to the solution. This result was highly unexpected because of the substantially insoluble nature of said phytates. With the exception of the alkali metal phytates, all of the known metallic salts of phytic acid are essentially insoluble in water and some, notably iron and aluminum phytates, are insoluble even in relatively concentrated solutions of strong acids. Although it is well known that cation exchange resins will remove metallic cations from a solution containing the same, it was entirely unexpected that a cation exchange resin would adsorb ions, such as calcium when brought into contact with a slurry of a calcium-containing material as insoluble as calcium phytate. Nevertheless, we discovered that on stirring aqueous suspensions of the aforementioned commercial phytates and a cation exchange resin in the hydrogen state, the liquid phase gradually became acid and the phytate went into solution, very slowly at first but more rapidly as the solution became more acid, and that finally essentially all of the phytate dissolved. While the solution resulting from removal of the resin when substantially all the phytate has dissolved, still contains a substantial amount of ash, this ash content can be decreased to a fairly low level by prolonged contact with an excess of the resin, so that reasonably pure solutions of phytic acid can be produced by this method.

Batchwise utilization of ion exchange resins usually is uneconomical, since equilibrium reactions are involved and a large excess of resin is required if substantially complete removal of adsorbable ions is required. It is well known that resin capacity is utilized much more efficiently if the solution to be deionized is passed over a column of the resin, but the latter mode of operation is impractical when a solid phase is present, e. g., in a slurry of phytate, such as calcium phytate. When the slurry also contains organic matter and ash not completely solubilized during contact with the resin, rapid fouling of the resin is unavoidable.

However, we have discovered that the phytic acid solution prepared by batchwise contact of a slurry of calcium phytate, magnesium phytate or calcium-magnesium phytate with a cation exchange resin in the hydrogen state will dissolve in the order of an additional equivalent of said phytates. The resulting solution then can be passed over a column of cation exchange resin in the hydrogen state to remove metallic cations from the solution, thus allowing much more efficient use of the resin.

Therefore, in our preferred process, after the preparation of a solution of phytic acid by the batchwise resin method or by other methods, we dissolve additional phytate, such as calcium phytate therein, filter the resulting solution and pass it over a column of regenerated cation exchange resin. Thereafter, we employ a partial recycle process, utilizing a portion of the phytic acid solution produced in each cycle to solubilize a new batch of said phytates as feed to the resin column. Thus, the product does not contain a foreign solubilizing acid as a contaminant, thereby exhibiting a distinct improvement over products produced according to the processes of the prior art.

It is known that at a pH of about 2.5 or lower commercial calcium phytate is substantially completely dissolved. However, we have found that when solutions are prepared in this way and passed over a column of regenerated cation exchange resin, although calcium can be removed efficiently, it is next to impossible to remove all metallic ions; ferric ions are particularly troublesome in this regard. Likewise, complete solubilization of the phytate results in substantial solubilization of nitrogenous and other impurities present in the original phytate, and these impurities are not removed efficiently by the resin. Consequently, when a commercial phytate is dissolved as completely as possible in an acid, whether this be phytic acid or some other acid, and the resulting solution is passed over a column of cation exchange resin, the resulting effluents always contain color and a substantial amount of ash, particularly iron. Such products are unsuitable for many uses. However, we have discovered that when a slurry of a commercial phytate is stirred with a cation exchange resin in the hydrogen state until the pH of the mixture is within the range of about 3 to about 4 and then filtered, the major portion of the iron and other impurities remain in the undissolved portion and the resulting filtrate can be substantially completely freed of metallic ions by passage over a column of regenerated cation exchange resin.

We have also discovered that recycling a portion of the resultant solution to solubilize a fresh portion of phytate containing approximately an equivalent amount of phytic acid, at a pH within the range of about 3 to about 4, permits the constant production of a solution of phytic acid which contains a very low concentration of metallic ions and represents phytic acid of excellent quality.

An alternate procedure which gives equally good results is to partially solubilize the starting phytate by addition of an acid such as hydrochloric, sulfuric, nitric or acetic acid, such acid being added to an aqueous slurry of the phytate until the pH drops to within the range of about 3 to about 4, filter the undissolved portion from the acidified slurry and neutralize the filtrate with sodium hydroxide or lime, for example, to reprecipitate the dissolved phytate. This is recovered as by filtration, and washed to remove the salt formed by neutralization of the acid used for solubilization. A purified grade of the phytate is thus obtained, a major portion of the iron, heavy metals, and other impurities having been removed in the undissolved portion and still other impurities having been eliminated as solubles during the reprecipitation process. Crude phytates purified in this manner can be solubilized completely by batchwise contact with an acid-regenerated cation exchange resin as already described, and then demineralized substantially completely by passage over a column of the resin to yield a solution of essentially pure phytic acid. A portion of this solution may be recycled to partially dissolve a new batch of phytate, which is then demineralized by passage over the cation exchanger or, if desired, each succeeding batch of phytate may be purified by partial solution in some other acid and reprecipitating, as already described, and then dissolved completely in the recycled phytic acid before passage over the cation exchanger. If for any reason it is more desirable, all demineralizations may be carried out batchwise instead of by passage over a column, but such operation is not as efficient from the standpoint of utilization of resin capacity.

Obviously, all the phytin content of the starting phytate is not recovered as phytic acid when our process is operated according to our preferred procedure, but the product is of much higher quality than can be obtained if the crude phytate is completely solubilized before passage over the resin. When commercial calcium phytate is solubilized in phytic acid, or any of the other acids mentioned, at a pH of about 3 to about 4, we have found that approximately 60 to 80 percent of the phytin phosphorus is solubilized.

When an acid other than phytic acid is used to partially solubilize the starting phytate prior to reprecipitation, nitric acid is the preferred acid for reasons to be explained hereinafter. Any of the commercially available, strongly acidic cation exchange resins is suitable for our process; examples of such cation exchangers are sulfonated polystyrene resins, such as those sold under the names of "Dowex-50" (Dow Chemical Company) and "Nalcite HOR" (National Aluminate Company), as well as sulfonated coal resins, such as that sold under the name "Zeocarb."

The following examples, which are intended as typical and informative only and not in a limiting sense, will further illustrate our invention:

*Example 1*

A slurry consisting of 500 grams wet calcium phytate press cake (23.6 grams total phosphorus), 1 liter of water, and 435 ml. of acid-regenerated "Dowex-50" cation exchange resin was agitated slowly until the pH level of the slurry dropped to 3.8. The mixture then was filtered and the filtrate (935 ml. containing 52 grams of phytic acid or 62 percent of the total phosphorus present in the starting calcium phytate) was passed over a column containing an excess of acid-regenerated "Dowex-50" resin to remove remaining metallic cations. The combined effluent and was represented a 5.5 percent solution of phytic acid and had a pH of 0.75. This solution was concentrated under vacuum to a phytic acid concentration of 15 percent.

*Example 2*

A portion of phytic acid solution obtained in Example 1, representing 14 grams of phytic acid, was added to 100 grams of wet calcium phytate press cake (17 percent phytin phosphorus, dry basis) and stirred until the pH dropped to 3.3. The mixture then was diluted with 100 ml. of water, heated to 70° C. and filtered. The filtrate, containing 78 percent of the total phosphorus in the starting materials, was passed over a column of regenerated "Dowex-50" resin until a rise in pH of the effluent was observed. The effluent then was evaporated under vacuum to a 15 percent concentration of phytic acid and a portion of the concentrate, representing 14 grams of phytic acid, was recycled as before; the remainder was combined with the portion of solution retained from the cycle of Example 1. An aliquot of the combined solutions, when dried and ashed at 1000° C., was found to contain only 0.8 percent ash and 0.05 percent iron. This solution of phytic acid was color stable when stored at room temperature.

Example 3

A batch of phytic acid was prepared by slurrying a sample of the same calcium phytate press cake employed in preceding examples with regenerated "Dowex-50" resin until a pH 2.6 (complete solubilization) was reached, filtering, and passing the filtrate over a column containing an excess of regenerated "Dowex-50" resin. This product contained ten times as much ash and seven times as much iron as was present in the products of Examples 1 and 2 and became dark colored on storage.

Example 4

A batch of calcium phytate press cake (10 lbs. 17 percent phytin phosphorus, dry basis) was slurried in water at room temperature and nitric acid was added with constant agitation until the pH dropped to about 3.2 to 3.6. Slow agitation was continued for about 30 minutes, the mixture then was filtered. The resulting filtrate contained about 70 percent of the original phytin phosphorus. This solution was neutralized to pH 5.5 with sodium hydroxide to reprecipitate the dissolved calcium phytate, which was removed by filtration. The filter cake was washed to remove the major portion of the sodium nitrate formed by neutralization of the nitric acid, and the washed cake was suspended in 1 to 2 parts of water. To the slurry there was added 1 cubic foot of acid-regenerated "Dowex-50" resin, and the mixture was stirred slowly until all of the purified calcium phytate had dissolved; the pH at this point was about 1.0. The resin was then removed and the solution passed over a column containing excess acid-regenerated "Dowex-50" resin. The effluent (pH about 0.8) was concentrated to a 40 percent solution of phytic acid. This solution was color stable and contained less than 1 percent ash and about 0.2 percent iron.

A portion (35 percent) of the concentrate was recycled to dissolve a new batch (10 lb.) of calcium phytate which had been purified by partial solubilization in nitric acid and reprecipitation, as already described. The resulting solution was demineralized by passage over a column of cation exchanger until a rise in pH level was observed, and the effluent was concentrated as before. Part of this concentrate was recycled, and the remainder was blended with the concentrate retained from the first cycle.

Highly concentrated solutions of phytic acid, even when relatively pure, may develop some color on prolonged storage. However, we have further found that incorporation of small amounts of oxidizing agents, such as sodium chlorite (0.1 to 0.5 percent), nitric acid (0.1 to 5 percent) or sodium nitrite (0.1 to 0.5 percent) are effective in preventing color development in such cases. When the phytate employed is purified by partial solubilization in nitric acid and reprecipitated before contacting the resin, as in Example 4, it is desirable not to wash out all the sodium nitrate from the cake, since this will subsequently be converted to nitric and nitrous acids, which we have discovered impart color stability to the final product. In cases where initial purification is not carried out as a separate step but is accomplished by partial solubilization in recycled phytic acid, as in Example 2, addition of a small amount of sodium nitrate (or other oxidizing agents mentioned above), in the specified small amount, to the final product will impart color stability thereto.

It is to be understood that in cases where yield rather than quality of product is of primary importance and a product of higher ash content and color can be tolerated, our process can be employed in such a manner that the starting material is more completely utilized, by operating the separation step at lower pH levels, without departing from the scope of our invention.

This is a division of application Serial No. 308,288, filed September 6, 1952.

We claim:
1. Process for the production of a stable aqueous solution of phytic acid from a phytate from the group consisting of calcium phytate, magnesium phytate, calcium-magnesium phytate, and mixtures thereof, comprising contacting an aqueous slurry of said phytate with a cation exchange resin, operating in the hydrogen cycle, for a period of time sufficient to solubilize a substantial proportion of said phytate, and stabilizing the resultant phytic acid solution by adding an oxidizing agent to the system any time after contact with the resin; said oxidizing agent being at least one compound from the group consisting of sodium chlorite, nitric acid, and sodium nitrite.

2. Process for the production of a stable aqueous solution of phytic acid from a phytate from the group consisting of calcium phytate, magnesium phytate, calcium-magnesium phytate, and mixtures thereof, comprising dissolving said phytate in an aqueous solution of phytic acid, and treating the solution obtained with a cation exchange resin, operating in the hydrogen cycle, to remove metallic cations therefrom, said phytate being dissolved in said phytic acid in an amount not exceeding approximately one equivalent weight thereof, and stabilizing the freshly produced phytic acid in solution by adding an oxidizing agent to the system any time after contact with the resin; said oxidizing agent being at least one compound from the group consisting of sodium chlorite, nitric acid, and sodium nitrite.

3. Process according to claim 2, characterized in that an additional amount of said phytate is dissolved in at least a portion of the phytic acid solution produced, and the solution thus obtained is treated with a cation exchange resin, operating in the hydrogen cycle, to remove metallic cations therefrom; said additional phytate being added to said portion of phytic acid solution in an amount not exceeding approximately one equivalent weight thereof.

4. Process for the production of aqueous phytic acid comprising adjusting the pH of an aqueous slurry of a phytate from the group consisting of calcium phytate, magnesium phytate, calcium-magnesium phytate and mixtures thereof to a value within the range from about 3 to about 4, filtering said slurry, reprecipitating said phytate from the filtrate, preparing an aqueous slurry of reprecipitated phytate, and treating said slurry with a cation exchange resin operating in the hydrogen cycle; and stabilizing the resultant phytic acid by adding to the system an oxidizing agent any time after contact with the resin; said oxidizing agent being at least one compound from the group consisting of sodium chlorite, nitric acid, and sodium nitrite.

5. Process according to claim 3 wherein the pH is adjusted to within said range by contacting said slurry with a cation exchange resin operating in the hydrogen cycle.

6. Process according to claim 3 wherein the pH is adjusted to within said range by addition of a mineral acid to said slurry.

7. Process according to claim 3 wherein the reprecipitated phytate is solubilized in aqueous phytic acid before treatment with said cation exchange resin.

8. Process for the production of a stable concentrated aqueous solution of phytic acid from a phytate from the group consisting of calcium phytate, magnesium phytate, calcium-magnesium phytate, and mixtures thereof, comprising contacting an aqueous slurry of said phytate with a cation exchange resin operating in the hydrogen cycle for a period of time sufficient to solubilize a substantial proportion of said phytate and concentrating the solution of said phytic acid to recover the phytic acid and adding an oxidizing agent any time after contact with the resin; said oxidizing agent being at least one compound from the group consisting of sodium chlorite, nitric acid, and sodium nitrite.

9. Process for stabilizing aqueous phytic acid which comprises incorporating therein an oxidizing agent selected from the group consisting of sodium chlorite, nitric acid, and sodium nitrite.

10. A stable concentrated aqueous solution of phytic acid having incorporated therein as a stabilizer a small proportion of an oxidizing agent selected from the group consisting of sodium chlorite, nitric acid, and sodium nitrite.

11. Process for the production of aqueous phytic acid from a phytate selected from the group consisting of calcium phytate, magnesium phytate, calcium-magnesium phytate, and mixtures thereof, comprising slurrying said phytate in water, adjusting the pH of the slurry to within the range of about 3 to about 4 by addition of nitric acid, filtering said slurry, reprecipitating said phytate from the filtrate by addition of sodium hydroxide, recovering the reprecipitated phytate, preparing an aqueous slurry of said reprecipitated phytate, contacting said slurry with a cation exchange resin operating in the hydrogen cycle for a period of time sufficient to adjust the pH of said slurry to about 1.0, separating the resultant solution from said cation exchange resin, passing said solution through a column containing excess strongly acidic cation exchange resin operating in the hydrogen cycle, concentrating the effluent from the cation exchange column to obtain concentrated, aqueous phytic acid, adding an additional amount of said reprecipitated phytate to at least a portion of said concentrated, aqueous phytic acid to solubilize said phytate, passing the solution thus obtained over a strongly acidic cation exchange resin, and concentrating the effluent.

References Cited in the file of this patent

UNITED STATES PATENTS

| | | |
|---|---|---|
| 2,339,164 | Greenfield | Jan. 11, 1944 |
| 2,691,035 | Thomas | Oct. 5, 1954 |